US008577574B2

(12) United States Patent
Ueno (10) Patent No.: US 8,577,574 B2
(45) Date of Patent: Nov. 5, 2013

(54) IN-VEHICLE CONTROL DEVICE (75) Inventor: Kentaro Ueno, Minami-Alps (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 114 days.

(21) Appl. No.: 13/202,369

(22) PCT Filed: Feb. 18, 2010

(86) PCT No.: PCT/JP2010/052468
§ 371 (c)(1),
(2), (4) Date: Oct. 12, 2011

(87) PCT Pub. No.: WO2010/113557
PCT Pub. Date: Oct. 7, 2010

(65) Prior Publication Data
US 2012/0053803 A1 Mar. 1, 2012

(30) Foreign Application Priority Data

Mar. 31, 2009 (JP) ................................. 2009-083977

(51) Int. Cl.
*B60T 8/171* (2006.01)
*B60T 8/88* (2006.01)
*B60T 17/22* (2006.01)
*B60T 8/172* (2006.01)

(52) U.S. Cl.
USPC ........................................................ 701/70

(58) Field of Classification Search
USPC ........................................................ 701/70
See application file for complete search history.

(56) References Cited

U.S. PATENT DOCUMENTS

| 6,382,737 | B1 * | 5/2002 | Isono et al. ................. 303/114.1 |
| 7,484,815 | B2 * | 2/2009 | Ogawa et al. ................. 303/122 |
| 8,235,472 | B2 * | 8/2012 | Tanabe et al. .............. 303/119.3 |
| 2006/0131953 | A1 * | 6/2006 | Nakayama et al. ........... 303/122 |
| 2006/0131954 | A1 * | 6/2006 | Ogawa et al. ............ 303/122.09 |
| 2007/0252429 | A1 * | 11/2007 | Lerchenberger et al. .. 303/113.2 |
| 2008/0054716 | A1 * | 3/2008 | Sato et al. ........................ 303/16 |
| 2009/0039702 | A1 * | 2/2009 | Nishino et al. ............. 303/114.1 |
| 2009/0096283 | A1 * | 4/2009 | Nishikawa et al. ....... 303/122.05 |
| 2009/0242725 | A1 * | 10/2009 | Tanabe et al. ................. 248/562 |
| 2009/0243376 | A1 * | 10/2009 | Tahara et al. ..................... 303/3 |
| 2009/0243381 | A1 * | 10/2009 | Tahara et al. .............. 303/114.1 |

FOREIGN PATENT DOCUMENTS

| CN | 101362460 A | 2/2009 |
| GB | 2 451 559 A | 2/2009 |

(Continued)

OTHER PUBLICATIONS

International Search Report dated May 25, 2010 including English-language translation (Four (4) pages).

*Primary Examiner* — Shelley Chen
(74) *Attorney, Agent, or Firm* — Crowell & Moring LLP (57) ABSTRACT

The in-vehicle control device includes first and second control units that perform first and second controls, respectively; first and second sensors for measuring the same physical quantity, and a transmission channel for communicating information between the first control unit and the second control unit. Outputs from the first and the second sensors are taken in and used for the first and the second controls by the first and the second control units, respectively. The first and the second control units repeatedly perform diagnoses of the first and the second sensors, respectively, and receive each results of measurements of the physical quantity measured based on the outputs of the first and the second sensors, respectively, through the transmission channel.

5 Claims, 7 Drawing Sheets

FOREIGN PATENT DOCUMENTS

| | | |
|---|---|---|
| JP | 2-77995 A | 3/1990 |
| JP | 4-185569 A | 7/1992 |
| JP | 8-322104 A | 12/1996 |
| JP | 2001219845 A * | 8/2001 |
| JP | 2003-200822 A | 7/2003 |
| JP | 2009-29416 A | 2/2009 |
| JP | 2009-40290 A | 2/2009 |

* cited by examiner

IN-VEHICLE CONTROL DEVICE

TECHNICAL FIELD

The present invention relates to an in-vehicle control device that is arranged in a vehicle.

BACKGROUND ART

In recent years, by-wire control, i.e., control by an electrically operated actuator such as, for example, brake-by-wire, throttle-by-wire, or steer-by-wire has been adopted in control apparatuses for vehicles in order to give a detailed control in order to cope with fine control. Various sensors are required for such control apparatuses so that when a sensor or sensors are in disorder serious accidents will occur due to inability to control. Also, unstable control will give uneasy feeling to drivers. Accordingly, diagnostic tests of sensors are carried out. When it is determined that a sensor is abnormal, safety back-up operation is carried out. Japanese Laid-open Patent Application No. 2003-200822 discloses a method for diagnosing abnormality of sensors, in which method the sensors have each a self diagnosis function and diagnostic signals are obtained from the sensors at predetermined timing.

The technology disclosed in Japanese Laid-open Patent Application No. 2003-200822 relates to a self diagnosis method for a hydraulic sensor in a brake control system. In this conventional technology, the brake control system is equipped with a plurality of sensors, of which only one sensor has a self diagnosis function to perform self diagnosis. The only one sensor is a hydraulic pressure sensor of high importance.

The timing at which self diagnosis is started is set to a time immediately before the start of control or a point in time when a certain condition that does not adversely affect the braking control is established.

CITATION LIST

Patent Literature

Japanese Laid-open Patent Application No. 2003-200822

SUMMARY OF INVENTION

Technical Problem

According to Patent Literature 1, the control can be switched to a corresponding backup control when it is determined that the sensor is abnormal upon self diagnosis performed during a time from a halting state to immediately before the start of the control. However, more thoroughgoing diagnosis is desirable in order to prevent accidents of vehicles.

Solution to Problem

It is an object of the present invention to provide a control device that performs detailed diagnosis and provides high safety.

An in-vehicle control device according to a first aspect of the present invention comprises: a first control unit mounted on a vehicle that performs first control; a second control unit mounted on the vehicle that performs second control; first and second sensors for measuring the same physical quantity, and a transmission channel for communicating information between the first control unit and the second control unit. In this in-vehicle control device, an output from the first sensor is taken in and used for the first control by the first control unit, an output from the second sensor is taken in and used for the second control by the second control unit, the first control unit repeatedly performs diagnosis of the first sensor, the second control unit repeatedly performs diagnosis of the second sensor, and the first control unit and the second control unit receive each a result of measurement of the physical quantity measured based on the output of the first sensor or the output of the second sensor through the transmission channel.

According to a second aspect of the present invention, in the in-vehicle control device of the first aspect, the first control unit can perform, according to the diagnosis operation of the first sensor, the first control based on information from the second control unit received through the transmission channel instead of the measured value of the physical quantity measured by the first sensor.

According to a third aspect of the present invention, in the in-vehicle control device of the first or second aspect, it is preferred that, when the first sensor is abnormal, the first control unit performs the first control based on information from the second control unit received through the transmission channel instead of the measured value of the physical quantity measured by the first sensor.

According to a fourth aspect of the present invention, in the in-vehicle control device of any one of the first through third aspects, when the diagnosis of the first sensor is being performed, the first control unit may perform the first control based on information from the second control unit received through the transmission channel instead of the measured value of the physical quantity measured by the first sensor.

An in-vehicle control device according to a fifth aspect of the present invention comprises: a first control unit mounted on a vehicle that performs a first control to control an output pressure of a master cylinder for braking; a second control unit mounted on the vehicle that performs a second control to control a wheel pressure control mechanism for braking; first and second sensors for measuring the output pressure of the master cylinder; and a transmission channel for communicating information between the first control unit and the second control unit. In this in-vehicle control device, an output from the first sensor is taken in and used for the first control by the first control unit, the output from the second sensor is taken in and used for the second control by the second control unit, the first control unit repeatedly performs diagnosis of the first sensor, the second control unit repeatedly performs diagnosis of the second sensor, and the first control unit and the second control unit receive each a result of measurement of the output pressure of the master cylinder measured based on the output of the first sensor or the output of the second sensor through the transmission channel.

An in-vehicle control device according to a sixth aspect of the present invention comprises: a first control unit that performs first control to control an output pressure of a master cylinder for controlling braking of a vehicle; a second control unit that performs second control for driving a wheel pressure control mechanism that feeds operating fluid for generating braking force to wheels in response to the output pressure of the master cylinder; and a first pressure sensor and a second pressure sensor for measuring the output pressure of the master cylinder. In this in-vehicle control device, the first control unit and the second control unit have each a function to communicate information, an output from the first pressure sensor is taken in and used for the first control by the first control unit, an output from the second pressure sensor is taken in and used for the second control by the second control unit, the first control unit repeatedly performs diagnosis of the first sensor, the second control unit repeatedly performs diagnosis of the second sensor, and the first control unit and the second control unit communicate each a result of measurement of the output pressure of the master cylinder measured based on the output of the first pressure sensor or the output of the second pressure sensor.

According to a seventh aspect of the present invention, in the in-vehicle control device of the sixth aspect, the first control unit can perform, according to the diagnosis operation of the first pressure sensor, the first control based on information received from the second control unit instead of the measured value of the output pressure of the master cylinder measured by the first pressure sensor.

According to an eighth aspect of the present invention, in the in-vehicle control device of the sixth or seventh aspect, it is preferred that, when the first pressure sensor is abnormal, the first control unit performs the first control based on information received from the second control unit instead of the measured value of the output pressure of the master cylinder measured by the first pressure sensor.

According to a ninth aspect of the present invention, in the in-vehicle control device of any of the sixth through eighth aspects, when the diagnosis of the first pressure sensor is being performed, the first control unit may perform the first control based on information received from the second control unit instead of the measured value of the output pressure of the master cylinder measured by the first pressure sensor.

An in-vehicle control device according to a tenth aspect of the present invention comprises: an assist piston that controls an output pressure of a master cylinder for controlling braking of a vehicle; an electric motor that moves the assist piston; a first control unit that performs first control for driving the electric motor; a second control unit that performs second control for driving a wheel pressure control mechanism to feed operating fluid that generates braking force to wheels in response to the output pressure of the master cylinder; and a first pressure sensor and a second pressure sensor for measuring the output pressure of the master cylinder. In this in-vehicle control device, the first control unit and the second control unit have each a function to communicate information, an output from the first pressure sensor is taken in and used for the first control by the first control unit, an output from the second pressure sensor is taken in and used for the second control by the second control unit, the first control unit repeatedly performs diagnosis of the first sensor, the second control unit repeatedly performs diagnosis of the second sensor, the first control unit, in the first control, obtains a command value relating to the output pressure of the master cylinder based on operation of a brake pedal and controls the electric motor based on a result of measurement according to the output pressure of the first pressure sensor and the command value, and the first control unit and the second control unit communicate each a result of measurement of the output pressure of the master cylinder measured based on the output of the first pressure sensor or the output of the second pressure sensor.

According to an eleventh aspect of the present invention, in the in-vehicle control device of the tenth aspect, it is preferred that at least one of the first control unit and the second control unit performs control by using the output pressure of the master cylinder received from other control unit when the output pressure of the master cylinder is not measured based on the diagnosis of the first pressure sensor or the second pressure sensor.

Advantageous Effect of the Invention

The present invention has an advantageous effect that it can further improve the safety of the control device.

DESCRIPTION OF EMBODIMENTS

Hereafter, embodiments of the present invention are described.

First Embodiment

Figure 1:
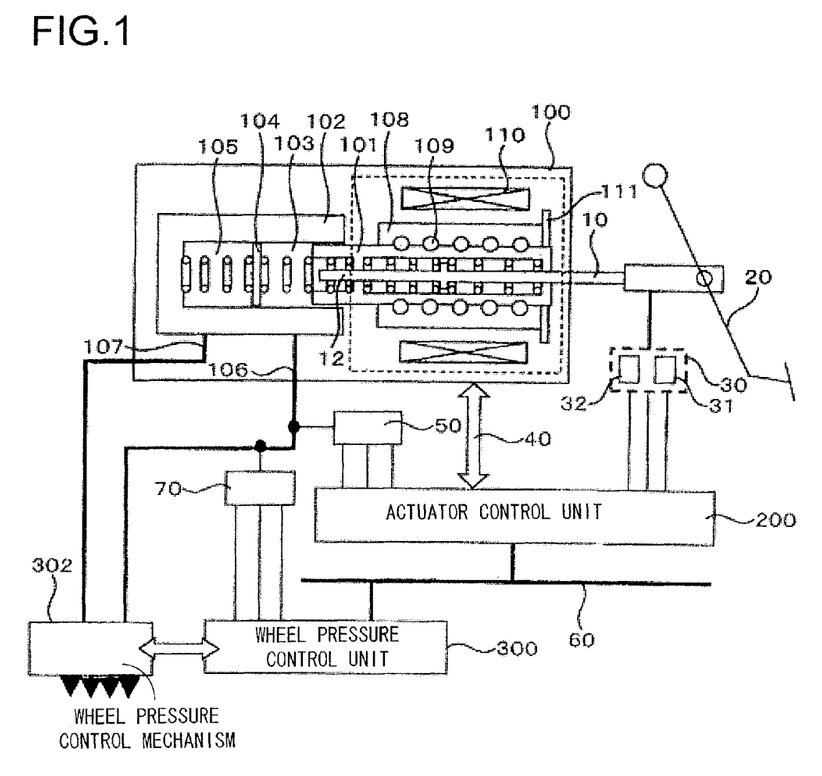
FIG. 1 presents a block diagram of a brake control system according to the present invention.
Figure 2:
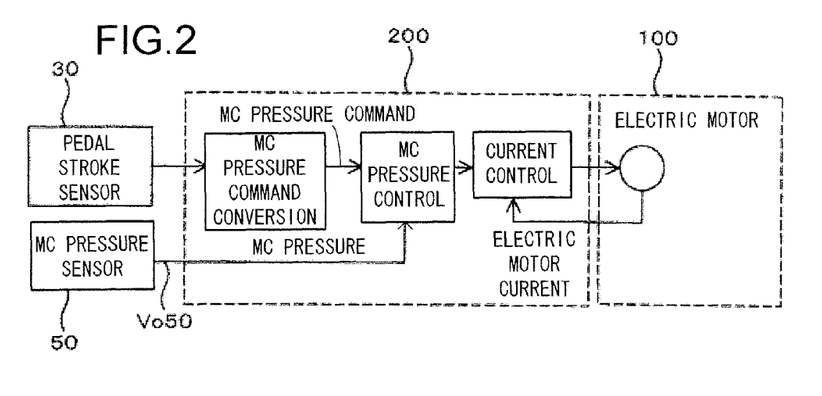
FIG. 2 presents a diagram showing a control block of an electrical motor brake operated actuator according to the present invention.

FIG. 1 presents a configuration diagram of a brake control apparatus for automobiles to which the present invention is applied. The brake control apparatus includes an actuator 100 and an actuator control unit 200. The actuator 100, which includes a master cylinder 102 and an electric motor, constitutes a mechanism for generating a fluid pressure of a brake fluid to be output by the master cylinder 102 based on an operation of a brake pedal 20. FIG. 2 presents a configuration diagram of a control block of the actuator control unit 200 for driving and controlling the actuator 100 shown in FIG. 1.

The configuration of the actuator 100 will be explained with reference to FIG. 1. An input rod 10 is connected at one end thereof to a brake pedal 20 and is provided with an input piston 12 at the other end. The input piston 12 is configured so as to be inserted into a primary fluid chamber 103 of the master cylinder 102 based on the operation of the brake pedal 20, so that an output pressure of the master cylinder 102 (hereafter, referred to as "master pressure") increases based on an operation of the brake by the driver. A force corresponding to the master cylinder pressure as a reaction force is applied to the brake pedal 20 through the input rod 10 to the driver.

The master cylinder 102 is a tandem cylinder that has two pressurizing chambers, i.e., a primary fluid chamber 103 that is pressurized by the input piston 12 or an assist piston 101 and a secondary fluid chamber 105 that is pressurized by a secondary piston 104. The secondary piston 104 is a free piston that moves such that the pressures on both sides thereof become equivalent to each other. Therefore, the pressure of the primary fluid chamber 103 and that of the secondary fluid chamber 105 are always substantially the same. The operating fluid pressurized by the input piston 12 or the assist piston 101 is supplied to a wheel pressure control mechanism 302 provided with a wheel pressure control valve through master pipes 106, 107. The wheel pressure control mechanism 302 receives fluid pressures from the master pipes 106, 107 and controls the pressure of the operating fluid in order to generate braking force and distributes the pressure-controlled operating fluid to a wheel cylinder of a hydraulic brake (not shown) provided to each wheel of a vehicle. The wheel cylinders press a disc rotor of each wheel with a brake pad to generate frictional braking force based on the hydraulic pressure of the operating fluid. The wheel pressure control mechanism 302 is controlled by a wheel pressure control unit 300.

On an outer periphery of the assist piston 101 is arranged a hollow rotor 108 of an electric motor. The outer peripheral surface of the assist piston 101 and an inner peripheral surface of the rotor 108 are engaged with each other through a ball screw 109. As a result, the rotative force of the rotor 108 is converted into the linear thrust of the assist piston 101. The rotor 108 is made of a material that forms a magnetic circuit with low loss and has a structure that scarcely generates eddy current. On the other hand, taking into consideration the engagement with the ball screw 109, it is desirable to fabricate the rotor 108 from a material with less wear. Therefore, it is desirable that the rotor 108 be produced by separately fabricating a part that engages with the ball screw 109 (hereafter, referred to as "ball screw nut part") and a part serving as a rotor that generates rotation torque and then mechanically integrate these parts upon assembling. Hereafter, to simplify the description, the above-mentioned mechanically integrated structure is called "rotor 108" collectively.

The electric motor has a stator winding 110 for generating rotation torque in the rotor 108. By supplying alternating current to the stator winding 110, rotation torque is generated in the rotor 108. The rotor 108 is formed of a magnetic pole that includes a permanent magnet for generating rotation torque based on rotating magnetic field generated by the stator winding 110. By controlling the stator current supplied to the stator winding 110 to control the rotation torque of the electric motor, the assist piston 101 can be forced into and out from the master cylinder 102. As a result, the output fluid pressure of the master cylinder 102 can be controlled and hence the braking force can be controlled.

The position, i.e., rotation state of the rotor 108 of the electric motor is detected by a rotation sensor 111. Therefore, the position or moving speed of the assist piston 101 can be detected based on the output from the rotation sensor 111. Based on the detected position or moving speed of the assist piston 101, the braking force by the electric motor and response speed for approaching a target braking force are controlled. The electric motor in the actuator 100 is controlled by an actuator control unit 200. Electric signals 40 necessary for controlling the actuator 100, such as an excitation signal for the stator 110, a current signal for the electric motor, or a position signal for the rotation sensor is communicated to the actuator control unit 200. In addition, as sources of sensor signals to be supplied for controlling the actuator 100, a stroke sensor 30 that detects operating amount of the brake pedal 20 and a pressure sensor 50 that detects the pressure of the master pipe 106 connected to the primary fluid chamber 103 are connected to the actuator control unit 200. The stroke sensor 30 includes two identical sensors, i.e., sensors 31 and 32.

Now, referring to FIG. 2, the configuration of the control block of the actuator control unit 200 is described. The actuator control unit 200 calculates a target braking force from a detected value from the stroke sensor 30 that indicates a brake operating amount. For example, by converting a target output pressure of the master cylinder 102 (hereafter, referred to as "MC pressure") into a command value, an MC pressure command value is calculated. By comparing the MC pressure command value, which is a target of control, with a detected value from the pressure sensor 50 that indicates an actual value of the MC pressure to calculate a control deviation, based on which compensation calculation is performed. The drive circuit connected to the stator 110 is controlled by the current control block such that the electric motor current detected by a sensor (not shown) reaches a value of the target of control. That is, a target MC pressure is calculated based on the operating amount of the brake pedal and the position of the assist piston 101 is controlled such that an actual pressure reaches the target MC pressure. The control of the position of the assist piston 101 is performed by controlling the torque generated by the electric motor.

In case of a genuine electric vehicle that runs using an electric motor for driving the vehicle or a hybrid electric vehicle that runs using an electric motor for driving the vehicle and an engine in combination, a braking force can be generated by performing so-called regenerative control, in which the electric motor for driving the vehicle is allowed to act as a generator. The control of the braking force of a vehicle is a combination of control of the braking force by regenerative control of the electric motor for driving the vehicle and control of the braking force by the friction force as explained above. In case the control of the braking force is achieved only by the regenerative control of the electric motor for driving the vehicle with a view to increasing the energy efficiency when the brake pedal 20 is operated by the driver, it is necessary that generation of friction braking be prevented from occurring. In this case, the electric motor moves the assist piston 101 in a direction opposite to that of the master cylinder 102 in order to prevent an increase in the fluid pressure of the master cylinder 102 generated by the input piston 12 from occurring.

In case the braking force to be generated by the regenerative control (hereafter, referred to as "regenerative braking") and the friction braking force are used in combination in response to the operation of the brake pedal 20, the actuator control unit 200 controls the electric motor so that the assist piston 101 can be pulled back in order to reduce the pressure of the operating fluid corresponding to the regenerative braking. That is, the electric motor is controlled such that the fluid pressure of the primary fluid chamber 103 is decreased. Control signals for the cooperation of the regenerative brake are input to the actuator control unit 200 from another control unit (not shown) through CAN (Controller Area Network) 60, which is one of local area networks. As a result, a command is given to the actuator control unit 200. Based on this command, the actuator control unit 200 controls the electric motor by setting, as a target pressure, a pressure that corresponds to a braking force obtained by subtracting a portion of the braking force borne by the regenerative braking from the target braking force.

The brake control includes control relating to improvement of safety in vehicle running, such as prevention of skidding which would occur while running on a curved road or the like, in addition to the above-mentioned braking force control in cooperation with the regeneration, that is, the fluid pressure control of the master cylinder 102. Such a control is performed by a wheel pressure control unit 300 that adjusts the braking force according to the behavior of the vehicle. In case of the vehicle with the actuator 100, controls of the wheel pressure control unit 300 and the actuator control unit 200 must be cooperating.

In FIG. 1, the wheel pressure control unit 300 and the actuator control unit 200 are connected to each other through the network via CAN 60. The pressure of the master pipe 106 coupled with the primary fluid chamber 103 is detected by a second pressure sensor 70 that is independent of the pressure sensor 50.

In braking control of vehicles, it is very important to improve and secure safety. For this purpose, a control unit that is used for braking control, for example, a pressure sensor that detects fluid pressure of the master cylinder 102, which is a sensor that detects an important control parameter with respect to control units used for braking control, for example, the actuator control unit 200 and the wheel pressure control unit 300 as described above, is provided to each of the control units. That is, the actuator control unit 200 and the wheel pressure control unit 300 include corresponding pressure sensors, respectively. Otherwise, if a pressure sensor is commonly used by a plurality of control units, all of the control units that use the sensor commonly become impossible to perform control due to malfunction of the sensor. For example, in case the actuator control unit 200 and the wheel pressure control unit 300 use a pressure sensor that detects the fluid pressure of the master cylinder 102, both the control units become impossible to perform control when the sensor is malfunctioning, so that abnormality of braking control cannot be backed up. Therefore, there is a possibility that serious damage will occur. Furthermore, even if the CAN 60 comes to be in failure, it is not likely that a plurality of sensors is in disorder simultaneously. Since each control unit can detect a target to be controlled by each sensor, each control unit can perform failsafe control when the CAN 60 becomes impossible to communicate, so that influences of the serious damage can be decreased.

In FIG. 1, the pressure sensors for important targets to be controlled include a pressure sensor 50 for controlling the actuator control unit 200 and a second pressure sensor 70 for controlling the wheel pressure control unit 300. These are provided independently of each other. In this manner, the pressure sensor 50 and the second pressure sensor 70 are provided in order to measure the output fluid pressure of the master cylinder 102, which is the same target to be controlled. That is, a plurality of independent detectors is provided for the same target to be measured. Since outputs of the sensors fall within the respective error range of the sensors, the sensors provide substantially the same detection results. By using this feature, not only it becomes possible to reduce serious damage due to malfunction of the sensors but also it is easy to perform self diagnosis.

Figure 3:
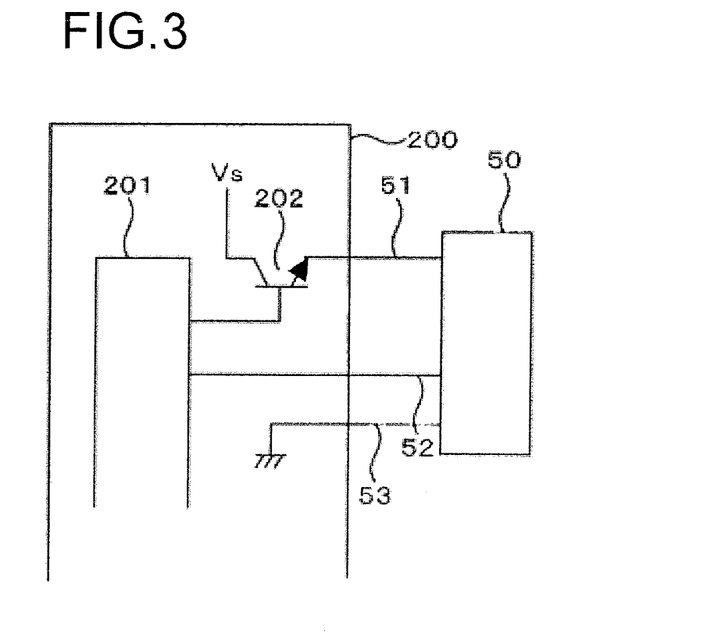
FIG. 3 presents a processing circuit diagram of a master pressure sensor according to the present invention.

Now, self diagnosis of sensors is explained. FIG. 3 shows a drive circuit of the pressure sensor 50. The second pressure sensor 70 has substantially the same circuit configuration and shows the same behavior as that of the pressure sensor 50, explanation is centered on the pressure sensor 50 as a representative.

The pressure sensor 50 that detects a control parameter of the actuator control unit 200 is connected to the actuator control unit 200 through a power source line 51 and a GND line 53 in order to be supplied with power from the actuator control unit 200. Further, the pressure sensor 50 and the actuator control unit 200 are connected to each other through an output line 52 for outputting detection result Vd of the pressure sensor 50. With this circuit configuration, a voltage of the sensor power source Vs is applied to the power source line 51 of the pressure sensor 50 through a switch element 202 and the output line 52 of the pressure sensor 50 is connected to an analog input terminal of a microcomputer 201. The GND line 53 of the pressure sensor 50 is connected to GND of the actuator control unit 200. Similar circuit configuration is adopted to connect the wheel pressure control unit 300 with the second pressure sensor 70.

In a state where the actuator control unit 200 does not perform control on the actuator 100, which is its primary object, for example when the vehicle is started up, self diagnosis of the pressure sensor 50 is performed. The self diagnosis is explained as follows. In the case of the wheel pressure control unit 300, self diagnosis of the second pressure sensor 70 is performed in conjunction with the self diagnosis of the pressure sensor 50 upon the startup. These self diagnosis methods are identical to each other and explanation is made on the pressure sensor 50 as a representative.

Figure 4:
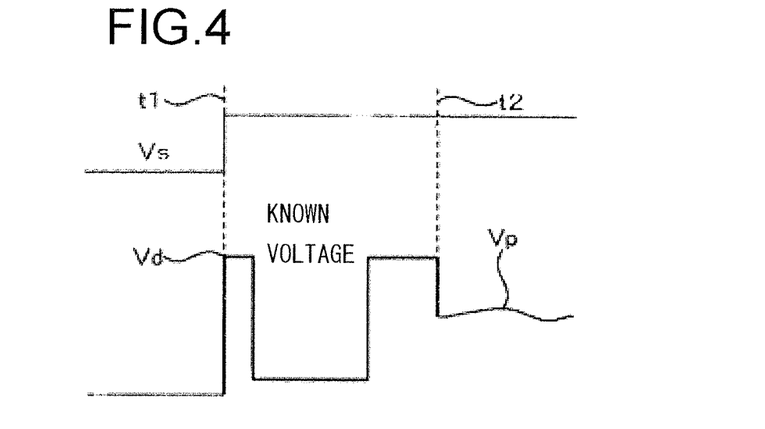
FIG. 4 presents a waveform diagram showing a result of a self diagnosis output from the master pressure sensor according to the present invention.

FIG. 4 shows a known voltage Vd output from the pressure sensor 50 by applying the voltage of the sensor power source Vs to the pressure sensor 50 through the switch element 202 when the pressure sensor 50 is normal. The voltage Vd is used for self diagnosis of the pressure sensor 50. The sensor 50 is configured such that it outputs a known voltage Vd when the circuit in the sensor is normal, regardless of whether the pressure to be measured, which is to be detected, is high or low. FIG. 4 shows an example of this. At time t1, the switch element 202 becomes conductive and a voltage of the sensor power source Vs is applied to the pressure sensor 50. As a result of the voltage application, a known voltage Vd is output from an output terminal of the sensor from time t1 to time t2 when the operation of the sensor is normal. The same will do with the second pressure sensor 70. The pressure sensor 50 and the second pressure sensor 70 include each in the inside thereof an integrated circuit responsive to pressure and an input-output circuit, and in addition, a switching circuit for generating a known voltage. In the pressure sensor 50 and the second pressure sensor 70, it becomes difficult to output the known voltage Vd when abnormality including disconnection occurs to the circuit inclusive of the integrated circuit.

Even if the known voltage Vd that indicates normality is output from the pressure sensor 50 or the second pressure sensor 70, the known voltage Vd cannot be normally detected when abnormality occurs to the output line 52 that transmits the output of the pressure sensor 50 or the second pressure sensor 70 to the microcomputer 201 or the circuit that detects the output of the pressure sensor in the microcomputer 201. Therefore, by testing whether or not the known voltage Vd can be detected, it becomes possible to diagnose not only the pressure sensor 50 or the second pressure sensor 70 but also the circuit that detects the output therefrom. This diagnosis is performed during the period from time t1 to time t2. Thereafter, detection operation to detect the MC pressure, which is an output from the master cylinder 102, is performed to provide an output Vp based on the MC pressure to the actuator control unit 200 or the wheel pressure control unit 300 through the output line 52. The microcomputer 201 for control included in the actuator control unit 200 or the wheel pressure control unit 300 performs AD conversion of the MC pressure that has been sent to it through the output line 52 and uses the resultant for control.

The period from the application of the voltage of the sensor power source Vs to the diagnosis period, i.e., time t1 to time t2 is several hundred milliseconds (ms) in this embodiment. During this diagnosis period, the pressure sensor 50 or 70 outputs the known voltage that is not based on the actual output of the master cylinder 102. Accordingly, braking control cannot be performed during this period. However, at the time of starting up the vehicle, there will be no particular problem if the braking control cannot be performed for a short period of several hundred milliseconds (ms).

Figure 5:
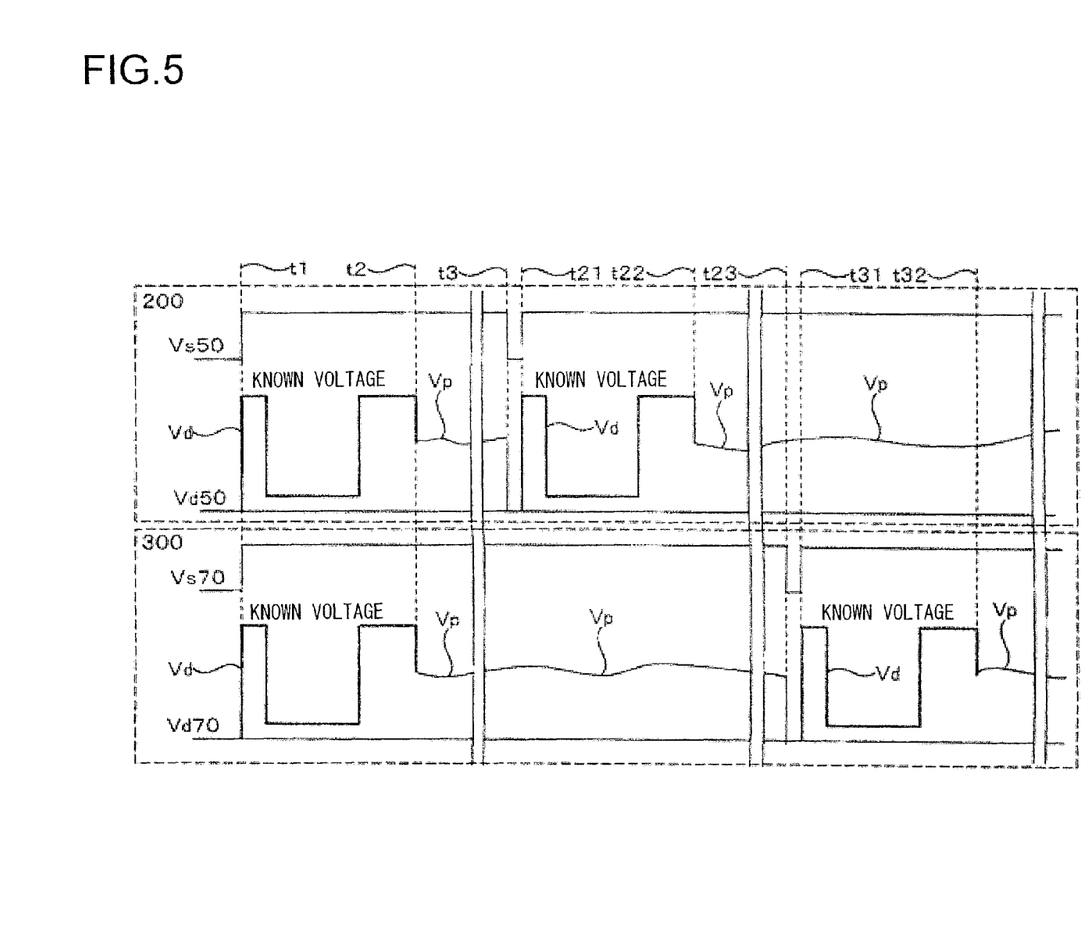
FIG. 5 presents a time-sequence diagram showing self diagnosis of the master pressure sensor according to the present invention.

Now, self diagnosis of the pressure sensor 50 or 70 during halting or running of the vehicle is explained. FIG. 5 shows the self diagnosis method not only at the time of starting up the vehicle but also during halting or running of the vehicle. In FIG. 5, the self diagnosis at the time of starting up as explained with reference to FIG. 4 is performed during the period from time t1 to time t2. In this diagnosis period, the pressure sensors 50, 70 are self-diagnosed substantially simultaneously and in parallel. On the other hand, during the period from time t2 to t3, the pressure sensors 50, 70 detect MC pressures regardless of whether the vehicle is halting or running During this period, the actuator control unit 200 detects the output Vp, which is a detected value of the pressure sensor 50. Similarly, the wheel pressure control unit 300 detects an output Vp, which is a detected value of the second pressure sensor 70. The braking control is performed based on the detection results of the pressure sensor 50 and the second pressure sensor 70.

At time t3, the actuator control unit 200 is halted by stopping the application of the voltage from the sensor power source Vs to the pressure sensor 50 by turning off the switch element 202. When the switch element 202 is turned on again at next time t21, voltage is applied to the pressure sensor 50 and self diagnosis is performed during a period from time t21 to time t22. As mentioned above, during the self diagnosis period from time t21 to time t22, the pressure sensor 50 outputs the known voltage Vd for diagnosis, so that it cannot detect any actual MC pressure. Therefore, the actuator control unit 200 obtains the MC pressure necessary for diagnosis from the second pressure sensor 70 instead of the pressure sensor 50 through the wheel pressure control unit 300. That is, during the period from time t21 to t22, the wheel pressure control device 300 detects the output from the second pressure sensor 70 to thereby detect the MC pressure, which is the output of the master cylinder 102. On the other hand, the actuator control unit 200 obtains the MC pressure from the wheel pressure control unit 300 through the CAN 60. Therefore, during the period from time t21 to t22, the actuator 100 can be controlled even if the diagnosis of the pressure sensor 50 is being performed.

After the time t22 when the self diagnosis of the pressure sensor 50 is completed, the actuator control unit 200 detects the output Vp from the pressure sensor 50 while the wheel pressure control unit 300 detects the output Vp, which is the detected value from the second pressure sensor 70 and these control units perform braking control independently of each other.

At time t23, the wheel pressure control unit 300 turns off a switch element provided in the wheel pressure control unit 300 that corresponds to the switch element 202 in order to perform diagnosis of the second pressure sensor 70 and stops application of voltage from the sensor power source Vs to the second pressure sensor 70. Thereafter, the switch element provided in the wheel pressure control unit 300 that corresponds to the switch element 202 is turned on to start application of voltage to the second pressure sensor 70 at time t31. With this operation, self diagnosis of the second pressure sensor 70 is performed during the period from time t31 to t32.

During the self diagnosis period from time t31 to t32, the second pressure sensor 70 cannot perform detection of the output from the master cylinder 102, so that the wheel pressure control unit 300 receives the output Vp, which is an output from the master cylinder 102, from the actuator control unit 200 through the CAN 60 and performs braking control, which is control of the wheel pressure control unit 300. At time t32, the self diagnosis of the second pressure sensor 70 is completed and the actuator control unit 200 performs control based on the output Vp from the pressure sensor 50 and the wheel pressure control unit 300 performs control based on the output Vp from the second pressure sensor 70.

The control illustrated in FIG. 5 is explained assuming that braking control has become necessary. In a state where no braking control is necessary, for example, in an accelerated state where the brake pedal 20 is not operated, the actuator control unit 200 or the wheel pressure control unit 300 does not perform braking control regardless of which one of the periods illustrated in FIG. 5 the vehicle is in.

Figure 6:
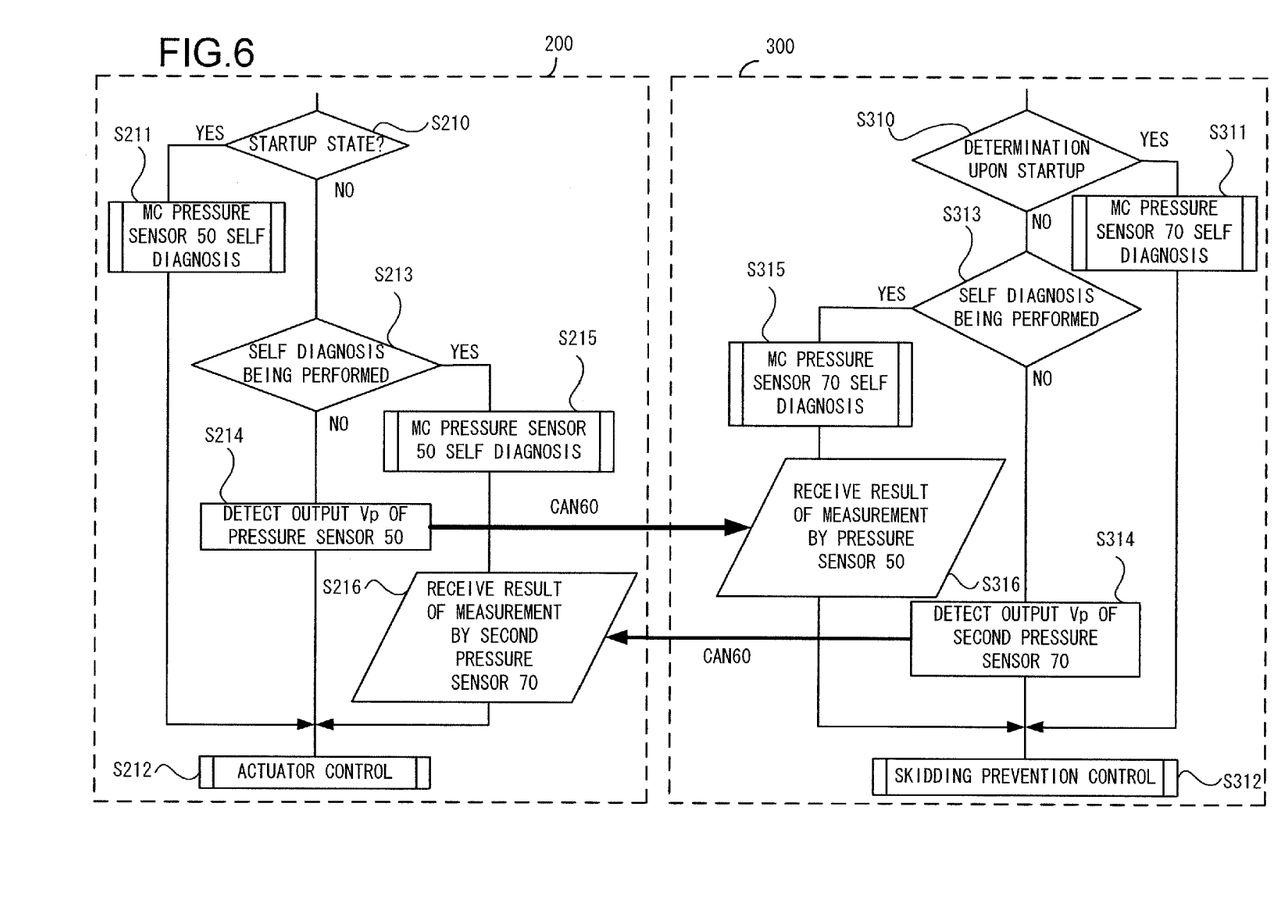
FIG. 6 presents a control flow diagram showing self diagnosis of the master pressure sensor according to the present invention.

FIG. 6 is a flowchart of control when the actuator control unit 200 performs self diagnosis. Hereafter, FIG. 6 is explained referring to elapsed time shown in FIG. 5. The flow illustrated in FIG. 6 is repeatedly performed at fixed time intervals. The actuator control unit 200 determines whether or not the vehicle is in a starting-up state in step S210. When the vehicle is in a starting-up state, the result of the determination in step S210 is YES and a self diagnosis subroutine of the pressure sensor 50 is performed in step S211. During the period from time t1 to time t2, the control flow illustrated in FIG. 6 is repeatedly performed at fixed time intervals and after each repetition the process proceeds from step S210 to step S211, thus repeating the self diagnosis of the pressure sensor 50. At time t2, the self diagnosis in step S211 in a state where the vehicle is in a starting-up state is completed. After time t2, the result of determination in step S210 is NO in performing the next control flow and the process proceeds to step S213.

During the period from time t2 to t3 in FIG. 5, the self diagnosis of the pressure sensor 50 is not performed. Therefore, NO is selected in step S213 and the output Vp from the pressure sensor 50 is detected as the fluid pressure output from the master cylinder 102 in step S214. This detected value is transmitted to the wheel pressure control unit 300 and the braking control based on the detected value is made possible to perform in step S212. If there is a need to perform braking control, for example, by operation of the brake pedal 20, control of the actuator 100 is performed in step S212.

As mentioned above, the program shown in FIG. 6 is performed at fixed time intervals. At timing of time t3 in FIG. 5, the result of determination in step S210 is NO, and the result of determination in the next step S213 is YES. In this case, the subroutine in step S215 is performed and the actuator control unit 200 first turns off the switch element 202 shown in FIG. 3. As a result, supply of the power source voltage applied to the pressure sensor 50 is stopped. With this, the self diagnosis of the pressure sensor 50 at timing t3 from step S216 through step S212 is completed. As mentioned above, the program shown in FIG. 6 is performed at fixed time intervals and therefore the above-mentioned state in which the self diagnosis is performed is repeated from time t3 to t21. Since the process always proceeds through step S216, if the result of measurement of output Vp, which is an output of the master cylinder 102, has reached from the wheel pressure control unit 300, the actuator control unit 200 receives the result of the measurement in step S216. When braking control becomes necessary in step S212, the braking control is performed based on the output Vp of the master cylinder 102 received in step S216.

At time t21 shown in FIG. 5, the result of determination in step S213 is YES. Based on this determination result, the subroutine in step S215 is performed. This time the switch element 202 in FIG. 3 is turned on again and voltage is applied to the pressure sensor 50. On this occasion, the pressure sensor 50, when it is normal, outputs the known voltage Vd. During the period from this time t21 to time t22, diagnosis of the pressure sensor 50 is performed. During the self diagnosis period from time t21 to t22, detection of the MC pressure by the pressure sensor 50 is impossible and the actuator control unit 200 receives the result of measurement by the second pressure sensor 70 transmitted from the wheel pressure control unit 300 in step S216. If the braking control is necessary, for example, in response to an operation of the brake pedal 20, the control of the actuator 100 in step S212 is performed using the result of measurement received from the second pressure sensor 70.

During the period from time t22 to a next self diagnosis, the result of determination in step S213 is NO. On this occasion, the actuator control unit 200 measures the output Vp of the pressure sensor 50 in step S214 and transmits the result of measurement to the wheel pressure control unit 300 through the CAN 60. If braking control is necessary, the actuator control unit 200 performs the braking control in step S212 using the result of measurement obtained in step S214. Since the software illustrated in FIG. 6 is performed at fixed time intervals as mentioned above, the actuator control unit 200 repeats performing the process along this route during the period from time t22 to a next self diagnosis.

Now, control of the wheel pressure control unit 300 is explained. The operation of the wheel pressure control unit 300 is basically similar to that of the actuator control unit 200 as explained above.

As mentioned above, the control flow illustrated in FIG. 6 is repeatedly performed at fixed time intervals. In step S310, the wheel pressure control unit 300 determines whether or not the vehicle is in a startup condition. If the vehicle is in a startup condition, the result of the determination in step S310 is YES and the wheel pressure control unit 300 performs the self diagnosis subroutine for the second pressure sensor 70 in step S311. The period from time t1 to time t2 shown in FIG. 5 is a period for self diagnosis. In this period, each time when the control flow illustrated in FIG. 6 is repeatedly performed at fixed time intervals, the process proceeds from step S310 to step 3211 and the self diagnosis of the second pressure sensor 70 is repeatedly performed. At time t2, the self diagnosis of the vehicle in a startup condition in step S311 is completed. After time t2, in the next control flow, the result of determination in step S310 is NO and the process proceeds to step S313.

During the period from time t2 to time t23 shown in FIG. 5, the self diagnosis of the second pressure sensor 70 is not performed. As a result, NO is selected in step S313 and the process proceeds to step S314. In step S314, the output Vp from the second pressure sensor 70 is detected as a fluid pressure output from the master cylinder 102. The detected value is transmitted to the actuator control unit 200, based on which it is possible to perform braking control in step S321. If braking control becomes necessary, for example, by operation of the brake pedal 20, the control of the wheel pressure control unit 300 is performed in step S312.

As mentioned above, the program illustrated in FIG. 6 is performed at fixed time intervals. At timing of time t23 in FIG. 5, the result of determination in step S310 is NO, and the result of determination in the next step S313 is YES. On this occasion, the subroutine in step S215 is performed and the wheel pressure control unit 300 first turns off a switch element provided inside the wheel pressure control unit 300, which switch element corresponds to the switch element 202 shown in FIG. 3. As a result, supply of the power source voltage applied to the second pressure sensor 70 is stopped. Then, the process proceeds from step S316 to step S312 and the self diagnosis of the second pressure sensor 70 at time t23 is completed. Since the program illustrated in FIG. 6 is repeatedly performed at fixed time intervals as mentioned above, the above-mentioned self diagnosis is repeatedly performed after time t23 up until time t31. Since the process always proceeds through step S316, the wheel pressure control unit 300 receives, in step S316, the result of determination of the output Vp, which is an output of the master cylinder 102, when such has already reached from the actuator control unit 200. If braking control becomes necessary in step S312, the braking control is performed based on the output Vp from the master cylinder 102 received in step S316.

At time t31, the result of determination in step S313 is YES. Based on this result of determination, the subroutine in step S315 is performed. This time, the switch element in the wheel pressure control unit 300 that corresponds to the switch element 202 is turned on again, and the power source voltage is applied to the second pressure sensor 70. On this occasion, if the second pressure sensor 70 is normal, the known voltage Vd is output. During the period from this to time t32, diagnosis of the second pressure sensor 70 is performed. During the self diagnosis period from time t31 to t32, detection of MC pressure by the second pressure sensor 70 is made impossible, so that the wheel pressure control unit 300 receives the result of measurement of the pressure sensor 50 transmitted from the actuator control unit 200 in step S316. If braking control becomes necessary, for example, by an operation of the brake pedal 20, the control of the wheel pressure control unit 300 in step S312 is performed using the result of measurement received from the pressure sensor 50.

During the period from time t2 to time t23 shown in FIG. 5 and the period from time t32 to a next self diagnosis, the result of determination in step S313 is NO. On this occasion, the wheel pressure control unit 300 measures output Vp of the second pressure sensor 70 in step S314 and transmits the result of measurement to the actuator control unit 200 through the CAN 60. If braking control is necessary, the braking control is performed in step S312 using the result of measurement obtained in step S314. Since the software illustrated in FIG. 6 is performed at fixed time intervals as mentioned above, the wheel pressure control unit 300 repeatedly performs the process in this route during the period from time t2 to time t23 and the period from time t32 to the next self diagnosis.

As illustrated in FIG. 5, the self diagnosis performing period (time t1 to time t2, time t23 to time t32) of the second pressure sensor 70 by the wheel pressure control unit 300 and the self diagnosis performing period (time t1 to time t2, time t3 to time t22) of the pressure sensor 50 by the actuator control unit 200 overlap for only the period from time t1 to time t2, which is the self diagnosis performing period at the startup time of the vehicle. That is, the self diagnosis at the startup of the vehicle is performed simultaneously for the pressure sensor 50 and the second pressure sensor 70. However, after the startup of the vehicle is completed, the self diagnoses are performed at different times without fail. According to the first embodiment of the present invention, in self diagnosis of each pressure sensor, the pressure sensors corresponding to the actuator control unit 200 and the wheel pressure control unit 300, respectively, are not subject to self diagnosis simultaneously excepting the startup time. Therefore, when one of the control units is during self diagnosis of the pressure sensor, the detected value of the pressure sensor in the other of the control units can be used, so that the plurality of the control units can perform self diagnosis of the corresponding pressure sensor without interruption. As a result, safety and reliability of control can be increased.

Output waveforms for self diagnosis of the pressure sensors 50, 70 are not limited to those shown in FIG. 4 and can be set in various forms. Alternatively, a waveform with two self diagnosis outputs may also be used. Instead of starting self diagnosis by turning on or off of the sensor power source Vs, it may be configured such that the diagnosis mode is started by transmission of a diagnosis signal to each sensor from the control unit.

Second Embodiment

According to the first embodiment, the self diagnosis of the pressure sensor 50 is performed at time t21 and the self diagnosis of the second pressure sensor 70 is performed at time t31 as shown in FIG. 5. In this manner, the self diagnosis of the pressure sensors is performed alternately at each constant period. Further, even when the two control units perform braking control, respectively, they receive detected values from the sensors in the different control units through transmission channels and use the detected values during the period from time t3 to t22 and during the period from time t23 to time t32.

In self diagnosis as in the case of the first embodiment in which self diagnosis is performed at a constant period, there is a possibility that there could occur an error operation such as outputting the known voltage Vd for self diagnosis beyond the period from time t1 to time t2. Alternatively, when there is a delay in transmission of the result of measurement through the CAN 60 or when a true detected value cannot be transmitted due to mixing of noises, there is a possibility that an erroneous braking control could be performed. A reduction in possibility of the occurrence of these drawbacks will lead to increased reliability of the control unit.

Figure 7:
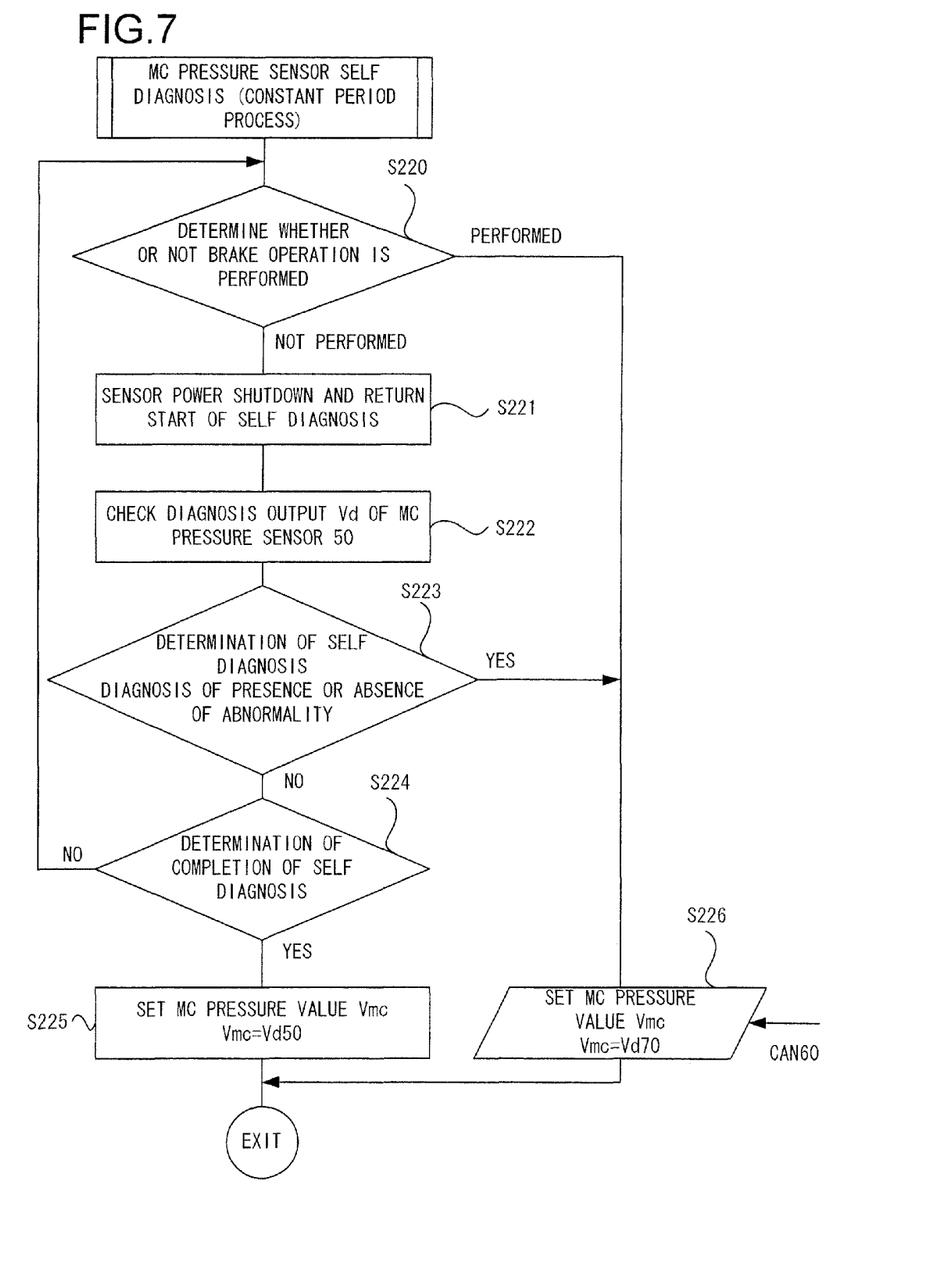
FIG. 7 presents another control flow diagram showing self diagnosis of the master pressure sensor according to the present invention.

In the second embodiment explained hereafter, a state in which a braking unit is operated or a non-operating state of the unit is detected before the self diagnosis is performed. Alternatively, the self diagnosis is performed by combining the result of such detections with the self diagnosis performed in a constant period. FIG. 7 shows timing in self diagnosis of the pressure sensor 50 in the actuator control unit 200, processing after the diagnosis, and a control flow for set values of MC pressure values Vmc.

The processing of the self diagnosis for the pressure sensor 50 shown in FIG. 7 is repeatedly performed at fixed time intervals by the actuator control unit 200. Separately from the flow of processing of self diagnosis shown in FIG. 7, the program of brake control illustrated in FIG. 2 and explained later is implemented for a constant time concurrently with the implementation of the program illustrated in FIG. 7. That is, the program of self diagnosis and the program of brake control are implemented separately from each other at predetermined operation periods. Among these controls, the implementation of the self diagnosis program is explained as follows.

When the self diagnosis program is implemented at fixed time intervals, a decision is made in step S220 as to whether or not the operation of the brake (also referred to as "braking maneuver") is performed. When no braking maneuver is performed, "NOT PERFORMED" is selected. On this occasion, the actuator control unit 200 first stops the application of sensor power source Vs in order to perform self diagnosis in step S221. That is, the switch element 202 in FIG. 3 is turned off. This corresponds to time t3 in FIG. 5. With this control, self diagnosis of the pressure sensor 50 is started. The process proceeds through steps S222 and S223 and it is determined that the self diagnosis has not been completed in step S224. Then, the implementation process proceeds again from step S220 to step S221.

The actuator control unit 200 then turns the switch element 202 on to supply power source voltage to the pressure sensor 50 in step S221. This corresponds to time t21 in FIG. 5. As a result, the pressure sensor 50 outputs the known voltage Vd for the diagnosis. In either this period or a next period whichever is appropriate, the actuator control unit 200 measures the known voltage Vd output by the pressure sensor 50 for the diagnosis to diagnose whether or not a normal voltage is output in step S222. Based on the result of diagnosis in step S222, abnormality or normality of the pressure sensor 50 is determined in step S223. That is, when the known voltage Vd is a voltage within the predetermined voltage range, it is determined that the pressure sensor 50 and the circuit from the pressure sensor 50 to signal measurement by microcomputer 201 is normal. If the result of determination in step S223 is normal, then "NO" is selected and determination of whether or not the self diagnosis is completed is performed in step S224. In actuality, the above process is performed in a short period, so that the process proceeds through the route from step S220 to step S224 a plurality of times. That is, until the diagnosis in step S224 is completed, "NO" is selected and steps S220 to S224 are repeated.

When the self diagnosis is completed, "YES" is selected in step S224. Then, the pressure sensor 50 outputs a voltage based on output Vp, which is an output voltage from the master cylinder 102. The output Vp is measured by the microcomputer 201. In step S225, the output Vp from the pressure sensor 50 is measured and stored for use in control. And the process of self diagnosis is completed.

During the period where no self diagnosis is performed, step S225 is performed for every predetermined time and an output from the pressure sensor 50 or 70 corresponding to the control unit 200 or 300, respectively, is subject to A/D conversion. Digital values, which are results of measurement, are stored in a memory and used for control. If the pressure sensor corresponding to the control unit is abnormal, it is determined whether or not the control unit is abnormal in step S223. On this occasion, measured values measured by the pressure sensor and transmitted from the other control unit are received and used for control in step S226. When brake operation, i.e., braking maneuver is performed while the self diagnosis is being performed, the brake operation is detected and "PERFORMED" is selected in the determination in step S220. On this occasion, measured values of the pressure sensor transmitted from the other control unit in step S226 are received and used for control. That is, since the pressure sensor 50 is under self diagnosis and a detected value Vo50 detected by the pressure sensor 50 does not represent MC pressure, the detected value detected by the second pressure sensor 70 in the wheel pressure control unit 300 obtained through the CAN 60 in step S226 is set as a measured value for control. As mentioned above, when the result of the self diagnosis in step S223 is abnormal, abnormality processing selected but not shown is performed and the measured value from the other sensor is received from the other control unit in step S228 and stored for use in control.

Determination of whether or not braking maneuver is performed in step S220 in the second embodiment can be done by using the following conditions singly or in combination of two or more thereof (1) Whether the brake switch is off;
(2) Whether the detected value Vo50 of the pressure sensor 50 or a detected value Vo70 of the second pressure sensor 70 indicates a value within a range in which no brake is operated, that is, in a range in which the electric motor in the electric motor-driven type actuator 100 is not operated;
(3) Whether the detected value detected by the stroke sensor 30 indicates a value within a range in which no brake is operated and the electric motor in the electric motor-driven type actuator 100 is not operated;
(4) Whether the position detected value detected by the rotation sensor 111 indicates a value within a range in which no brake is operated and the electric motor in the electric motor-driven type brake actuator 100 is not operated; and
(5) Whether data of the brake operating amount transmitted through the CAN 60 indicates a value within a range in which no brake is operated.

In the second embodiment, in addition to the advantageous effects obtained in the first embodiment, there is obtained an advantageous effect that erroneous braking control is not performed since the self diagnosis is performed at timing at which no brake operation is performed, that is at timing at which the detected value Vo50 detected by the pressure sensor 50 is not used for control.

Even if a brake operation is performed during the self diagnosis, safety is not damaged since the braking control can be continued by using the detected value Vo70 detected by the second pressure sensor 70.

The method of determination of the pressure sensors 50, 60 at the startup in the first and the second embodiments (FIG. 6, step S210 and step S310) include the following conditions. These may be used for the determination singly or in combination of two or more of them.

(1) Whether the ignition switch is operated;
(2) Whether battery voltage is supplied to the control unit;
(3) Whether the brake switch is turned on;
(4) If the actuator control unit 200 is started up when the brake pedal is pressed down, self diagnosis can be performed before the braking control is performed;
(5) Whether a door switch is operated. In a key-less system of automobiles, ignition switches are not used any longer and the power of the control unit is turned on by opening or closing of the door. This type of control may also be adopted.
(6) The determination may be performed by using a startup signal from the CAN 60. In CAN communication for controlling automobiles, there may be adopted a system in which a main control unit that control overall the automobile is pointed and a startup signal (wakeup) is distributed from the main control unit to each control unit to notice start of control. Note that the startup signal (wakeup) may be transmitted not through the CAN 60.

Third Embodiment

In the second embodiment, whether or not self diagnosis determination is to be performed is determined based on whether or not brake operation is performed in step S220. In addition to such a method of directly detecting information that is changed when the brake is operated, a method of indirectly detecting a condition under which brake operation is not performed may be applied to the present invention.

The following conditions relate how to indirectly detect conditions under which no brake is operated, that is, conditions for determination.

(1) Whether a fluid pressure command for deceleration has not been generated in a vehicle equipped with an Automatic Cruise Control (ACC);
(2) Whether an Anti-lock Braking System (ABS) or a wheel pressure control unit (Vehicle Dynamics Control (VDC) unit) is not operated; and
(3) Whether brake control is performed based on only the information from the stroke sensor 30 in controlling the actuator 100. That is, the detected value Vo50 detected by the pressure sensor 50 is not used for braking control.

Fourth Embodiment

According to the first to the third embodiments, the method of self diagnosis of the pressure sensors 50, 70 and the method of continuing braking control have been described above. The fourth embodiment is an embodiment of the control method for the actuator control unit 200 when the result of self diagnosis is abnormal.

If one of the pressure sensors 50 and 70, for example, the second pressure sensor 70 becomes abnormal and cannot be used any longer, this gives influences on the self diagnosis of the pressure sensor 50. On this occasion, it is conceivable that at worst, the self diagnosis of the pressure sensor 50 cannot be performed. This is because if the self diagnosis of the pressure sensor 50 is done, there is a possibility that there will be no means to detect actual MC pressure during that period so that the control shown in FIG. 2 cannot be continued. In such a case, it is desirable to adopt a method in which if one of the pressure sensors is abnormal, the other pressure sensor performs control of the actuator control unit 200 while it is performing the self diagnosis.

Figure 8:
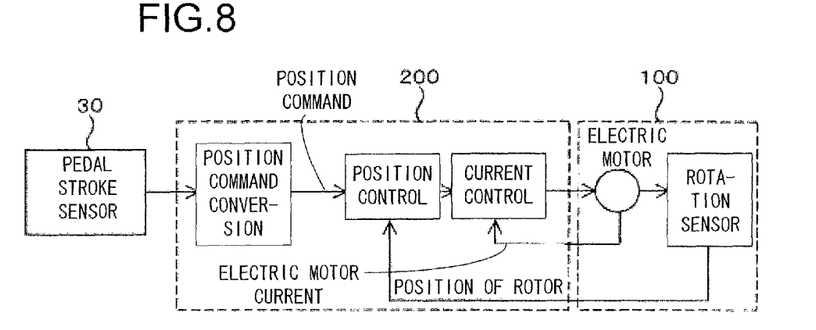
FIG. 8 presents a diagram showing a control block when the master pressure sensor is abnormal.
Figure 9:
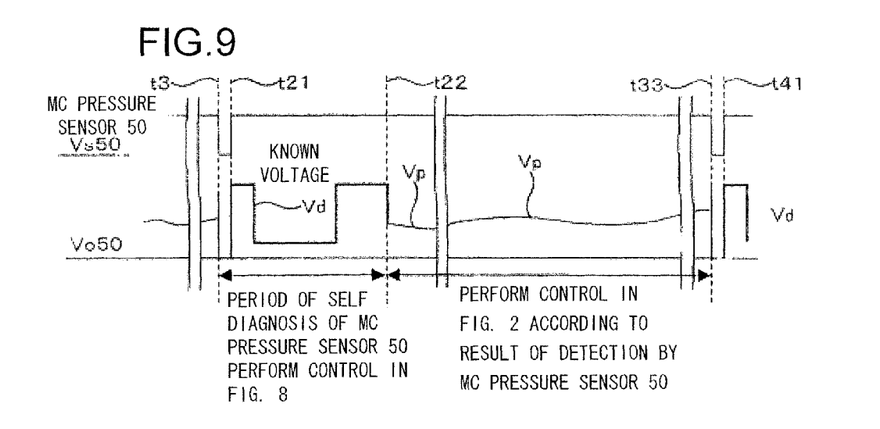
FIG. 9 presents a time-sequence diagram when the master pressure sensor according to the present invention is abnormal.

FIG. 8 presents a control block diagram. FIG. 9 presents a time chart for self diagnosis of the pressure sensor 50 and control illustrated in FIG. 8. In FIGS. 8, 9, parts that are same as those shown in FIGS. 2, 5 are designated by same reference numerals. Hereafter, explanation is made on FIGS. 8, 9 together with the configuration shown in FIG. 1. In FIG. 8, there is obtained no detected value Vo70 from the second pressure sensor 70 in t3 to t22 during the period of self diagnosis for the pressure sensor 50 shown in FIG. 9, so that the actuator control unit 200 is controlled as follows.

When the driver presses down the brake pedal 20, the pedal stroke sensor 30 detects a pressing down amount of the brake pedal 20 and the detected value is converted into a position command by a process of converting position command conversion by the input rod 10 in the actuator control unit 200. Based on the deviation value between the position command and the position of the input rod 10 detected by the rotation sensor 111 in the actuator 100, current of the electric motor 110 is controlled to obtain an appropriate torque. The torque of the electric motor 110 is converted into linear thrust which promotes the assist piston 101 to generate a braking force.

During the period from t22 to t33 in FIG. 9, the control illustrated in FIG. 2 is performed based on the detected value Vo50 from the normal pressure sensor 50.

According to the fourth embodiment, there is obtained an advantageous effect that, even if one of the pressure sensors 50 or 70 has been determined to be abnormal upon self diagnosis, braking control can be continued by adopting a different control method for the actuator control unit 200 based on the detected values from the other normal pressure sensor and the pedal stroke sensor 30. The situations in which the detected value Vo70 from the second pressure sensor 70 is not obtained may include abnormality of the sensor 70 in itself and in addition malfunction of the CAN communication line, for example, breakage of the CAN communication line, communication error by mixing of noises or the like. According to this embodiment, there is obtained an advantageous effect that in such situations as mentioned above, braking control can be continued by changing the control method of the actuator control unit 200 similar to those shown in FIGS. 8,9.

Fifth Embodiment

The first to the fourth embodiments relate to methods in which the pressing down amount of the brake pedal 20 by the driver is detected by the pedal stroke sensor 30, and based on this amount, the actuator control unit 200 is controlled while the self diagnosis of the pressure sensors 50 and 70 is being performed (see FIGS. 2, 8).

In the actuator control unit 200, the pedal stroke sensor 30 as well as the pressure sensor 50 is an important sensor and is a target of disorder diagnosis. It is an important condition that control can be continued even when the pedal stroke sensor 30 is in disorder.

Figure 10:
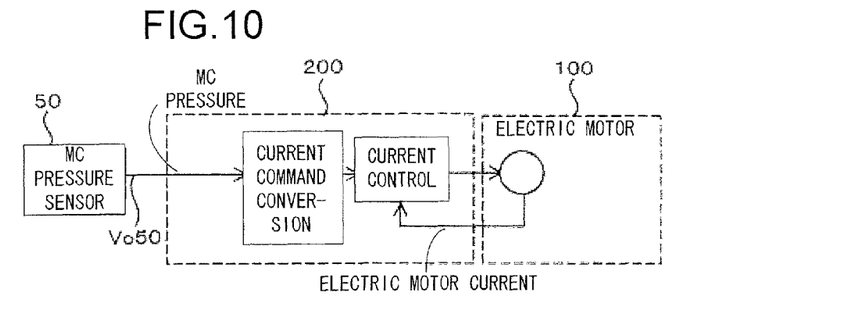
FIG. 10 presents a block diagram illustrating control when the pedal stroke sensor according to the present invention is abnormal.
Figure 11:
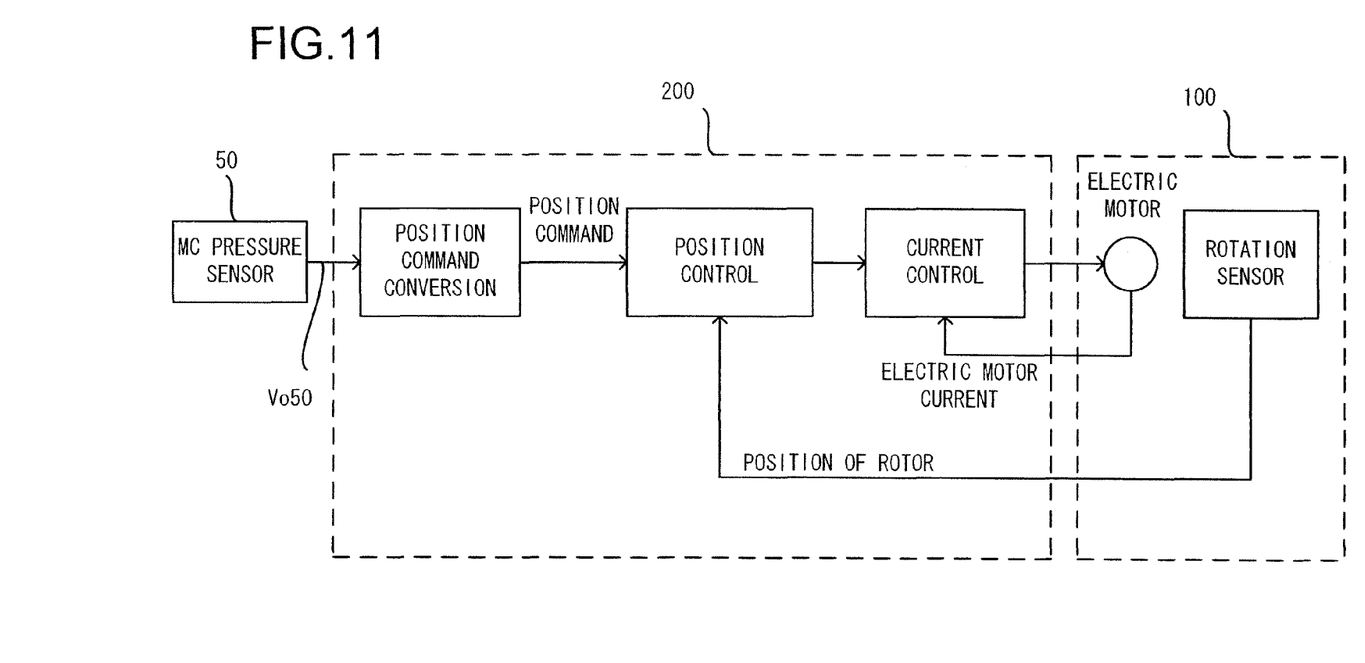
FIG. 11 presents another block diagram showing control when the pedal stroke sensor according to the present invention is abnormal.

FIGS. 10 and 11 present each a control block diagram illustrating a method of controlling the actuator control unit 200 when disorder is detected in the disorder diagnosis of the pedal stroke sensor 30. In this case, it is presumed that the pressure sensors 50 and 70 are alternately self-diagnosed and both of them are determined to be normal.

In the configuration shown in FIG. 10, a current command conversion element that estimates electric motor current to be applied to the actuator 100 from a detected value detected by the pressure sensor 50 is added and the rotation of the electric motor is controlled based on the current command value output from the current command conversion element.

In the configuration shown in FIG. 11, a position command conversion element that estimates a position of the assist piston 101 based on the detected value detected by the pressure sensor 50 is added and the rotation of the electric motor is controlled based on the position of the input rod 10 and a deviation value of the rotation sensor 111 output from the position command conversion element. With this configuration, there is obtained an advantageous effect that even if the pedal stroke sensor 30 is in disorder, the actuator control unit 200 can be controlled while the self diagnosis of the pressure sensors 50 and 70 are being alternately performed.

According to the fourth and the fifth embodiments, explanation has been made on the method of controlling the actuator control unit 200 in case abnormality is detected as a result of the self diagnosis. In this regard, it is useful to inform the driver of the vehicle of a site at which disorder has occurred since to do so provides a sense of safety to the driver and invites the driver to drive the vehicle accordingly, thus increasing safety. Accordingly, when the result of self diagnosis is abnormality, an alarm display may be lighted up to draw the driver's attention and point out the abnormal site clearly.

According to the first to the third embodiments, the result of abnormality in the self diagnosis for the pressure sensors 50, 70 during the period, for example, from the turning-on to the turning-off of the ignition switch, is overwritten after each self diagnosis and is not stored.

However, in the case of braking control, which is very important for the safety of the vehicle, it is desirable to store the results of abnormality as history and refer to it to know an abnormal change in order to avoid unforeseeable circumstances, thus increasing the safety of the vehicle. Accordingly, the result of abnormality found by each self diagnosis is stored in a nonvolatile memory that can store the results as a history.

In the first to the third embodiment, explanation has been made on the method of self diagnosing the two pressure sensors 50, 70 and set values of MC pressure during the self diagnosis between the two control units, i.e., the actuator control unit 200 and the wheel pressure control unit 300. However, it is also within the scope of the present invention to use more than two control units.

According to the first to the fifth embodiments, explanation has been made on the embodiments of self diagnosis of the master pressure sensor and the stroke sensor in the master pressure control unit and the wheel pressure control unit for braking control of the vehicle. However, the target to be controlled, the control unit and the sensors are not limited to these.

For example, in controlling automobiles, the present invention can be applied to self diagnoses for a system having at least two sensors such as an A/F sensor and an exhaust gas flow rate sensor in an engine control unit for controlling fuel injection and for controlling exhaust reflux, respectively, an electric motor-driven type throttle sensor, a variation detecting sensor commonly used by an engine control unit and a transmission control unit, and so on.

The present invention is applicable to self diagnosis of a system having at least two variation amount detection sensors for performing various controls of industrial vehicles, railway vehicles, electrically-moving machine such as elevators, accessory units, household units, control units, and so on.

In the above-mentioned embodiments, it has been explained that abnormality of pressure sensors is diagnosed based on known voltages. However, the above-mentioned embodiments enable detection of not only abnormality of pressure sensors but also abnormality of electric connection between the pressure sensors and the A/D converter in the control unit. If abnormality is found in the electric connection, measurement becomes impossible regardless of whether or not the sensor is normal. On this occasion, it is possible to determine whether or not the sensor is normal by determining whether the sensor output value is within the know range. For example, if the breakage of wire has occurred, the output value of the sensor is, for example, zero or the value of power source voltage i.e., beyond the known range in which normal values will fall. In case of in-vehicle type units, it is conceivable that the vehicle is used in an environment where it is subjected to frequent vibrations or in a severe environment; for example, the vehicle runs in a region where the soil has high salt contents. Therefore, abnormality occurs not only in the inside of the sensor but also it is highly possible that abnormality may occur between the sensor and an input terminal of the control circuit that incorporates an output from the sensor. When abnormality of a sensor is determined, the above-mentioned embodiment performs comparative determination as to whether or not the measured value exceeds a predetermined range by a comparative function. That is, a method of comparing a measured value with a known value can be used. Such a determination of failure can be effectively used in the control unit in whole. In addition, satisfactory countermeasures can be taken against failures, so that safety and reliability increases.

Disclosure of the following base application to which priority is claimed in the present application is incorporated herein by reference: Japanese Patent Application No. 2009-83977 (filed Mar. 31, 2009).

EXPLANATION OF SYMBOLS 10 input rod
20 brake pedal 31, 32 stroke sensors
50, 70 master pressure sensor
60 CAN
100 electric motor-driven type actuator
200 actuator control unit (master pressure control unit)
300 wheel pressure control unit

The invention claimed is:

1. An in-vehicle control device comprising:
a first control unit mounted on a vehicle that performs first control to control an output pressure of a master cylinder for braking;
a second control unit mounted on the vehicle that performs second control to control a wheel pressure control mechanism for braking;
first and second sensors for measuring the output pressure of the master cylinder, and
a transmission channel for communicating information between the first control unit and the second control unit, wherein:
an output from the first sensor is taken in and used for the first control by the first control unit;
an output from the second sensor is taken in and used for the second control by the second control unit;
the first control unit repeatedly performs diagnosis of the first sensor;
the second control unit repeatedly performs diagnosis of the second sensor;
the first control unit and the second control unit receive each a result of measurement of the output pressure of the master cylinder measured by each other through the transmission channel;
when the first control is being performed, the first control unit does not perform the diagnosis of the first sensor; and
when the first control is performed while the diagnosis of the first sensor is being performed, the first control unit performs the first control based on the measurement value of the output pressure of the master cylinder measured by the second sensor and received from the second control unit through the transmission channel instead of the measurement value of the output pressure of the master cylinder measured by the first sensor.

2. An in-vehicle control device according to claim 1, wherein:
when the first sensor is abnormal, the first control unit performs the first control based on the measurement value of the output pressure of the master cylinder measured by the second sensor and received from the second control unit through the transmission channel instead of the measured value of the physical quantity measured by the first sensor.

3. An in-vehicle control device comprising:
a first control unit that performs first control to control an output pressure of a master cylinder for controlling braking of a vehicle;
a second control unit that performs second control for driving a wheel pressure control mechanism that feeds operating fluid for generating braking force to wheels in response to the output pressure of the master cylinder; and
a first pressure sensor and a second pressure sensor for measuring the output pressure of the master cylinder; wherein:
the first control unit and the second control unit have each a function to communicate information;
an output from the first pressure sensor is taken in and used for the first control by the first control unit;
an output from the second pressure sensor is taken in and used for the second control by the second control unit;
the first control unit repeatedly performs diagnosis of the first pressure sensor;
the second control unit repeatedly performs diagnosis of the second pressure sensor;
the first control unit and the second control unit communicate each a result of measurement of the output pressure of the master cylinder measured by each other;
when the first control is being performed, the first control unit does not perform the diagnosis of the first pressure sensor; and
when the first control is performed while the diagnosis of the first pressure sensor is being performed, the first control unit performs the first control based on the measurement value of the output pressure of the master cylinder measured by the second pressure sensor and received from the second control unit instead of the measurement value of the output pressure of the master cylinder measured by the first pressure sensor.

4. An in-vehicle control device according to claim 3, wherein:
when the first pressure sensor is abnormal, the first control unit performs the first control based on the measurement value of the output pressure of the master cylinder measured by the second pressure sensor and received from the second control unit instead of the measured value of the output pressure of the master cylinder measured by the first pressure sensor.

5. An in-vehicle control device comprising:
an assist piston that controls an output pressure of a master cylinder for controlling braking of a vehicle;
an electric motor that moves the assist piston;
a first control unit that performs first control for driving the electric motor;
a second control unit that performs second control for driving a wheel pressure control mechanism to feed operating fluid that generates braking force to wheels in response to the output pressure of the master cylinder; and
a first pressure sensor and a second pressure sensor for measuring the output pressure of the master cylinder, wherein:
the first control unit and the second control unit have each a function to communicate information;
an output from the first pressure sensor is taken in and used for the first control by the first control unit;
an output from the second pressure sensor is taken in and used for the second control by the second control unit;
the first control unit repeatedly performs diagnosis of the first pressure sensor;
the second control unit repeatedly performs diagnosis of the second pressure sensor;
in the first control by the first control unit, a command value relating to the output pressure of the master cylinder is obtained based on operation of a brake pedal and the electric motor is controlled based on a result of measurement according to the output pressure of the first pressure sensor and the command value;
the first control unit and the second control unit communicate each a result of measurement of the output pressure of the master cylinder measured by each other;
when the first control is being performed, the first control unit does not perform the diagnosis of the first pressure sensor; and
when the first control is performed while the diagnosis of the first pressure sensor is being performed, the first control unit performs the first control based on the measurement value of the output pressure of the master cylinder measured by the second pressure sensor and received from the second control unit instead of the measurement value of the output pressure of the master cylinder measured by the first pressure sensor.

* * * * *